(12) United States Patent
Hatakeyama

(10) Patent No.: US 7,219,197 B2
(45) Date of Patent: May 15, 2007

(54) CACHE MEMORY, PROCESSOR AND CACHE CONTROL METHOD

(75) Inventor: Tsutomu Hatakeyama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 170 days.

(21) Appl. No.: 10/695,997

(22) Filed: Oct. 30, 2003

(65) Prior Publication Data

US 2004/0139277 A1    Jul. 15, 2004

(30) Foreign Application Priority Data

Oct. 30, 2002    (JP)    ............................. 2002-315896

(51) Int. Cl.
    *G06F 12/00*    (2006.01)
    *G06F 12/14*    (2006.01)

(52) U.S. Cl. ..................... 711/142; 711/114; 711/113; 711/118

(58) Field of Classification Search ......... 711/142.114, 711/113, 118
    See application file for complete search history.

(56) References Cited

U.S. PATENT DOCUMENTS 5,696,937 A * 12/1997 White et al. ................. 711/142
6,516,387 B1    2/2003  Auracher

FOREIGN PATENT DOCUMENTS

JP    01-183750    7/1989
JP    03-263144    11/1991

* cited by examiner

*Primary Examiner*—Matthew Kim
*Assistant Examiner*—Lev Iwashko
(74) *Attorney, Agent, or Firm*—Oblon, Spivak, McClelland, Maier & Neustadt, P.C.

(57) ABSTRACT

A cache memory, comprising: a data storage capable of storing data which requires consistency of data with a main memory; and a storage controller which controls to store data which does not require consistency of data with said main memory in an arbitrary data region in said data storage.

19 Claims, 3 Drawing Sheets

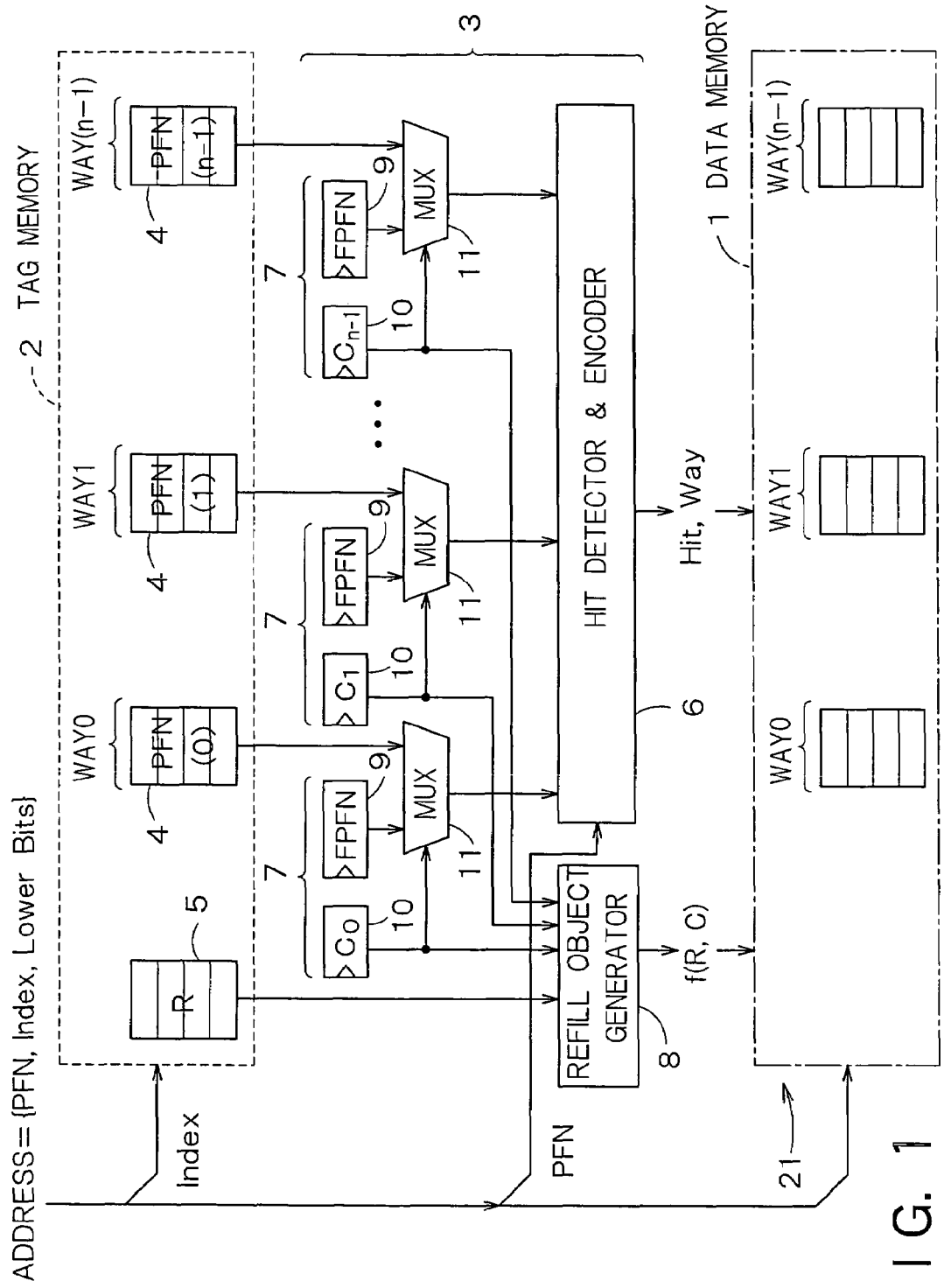
F I G. 1

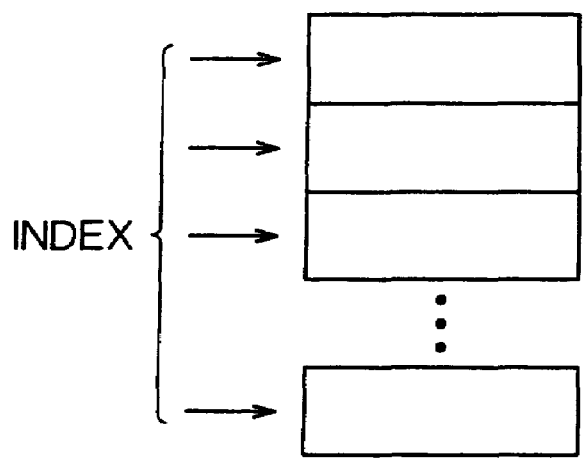
F I G. 2
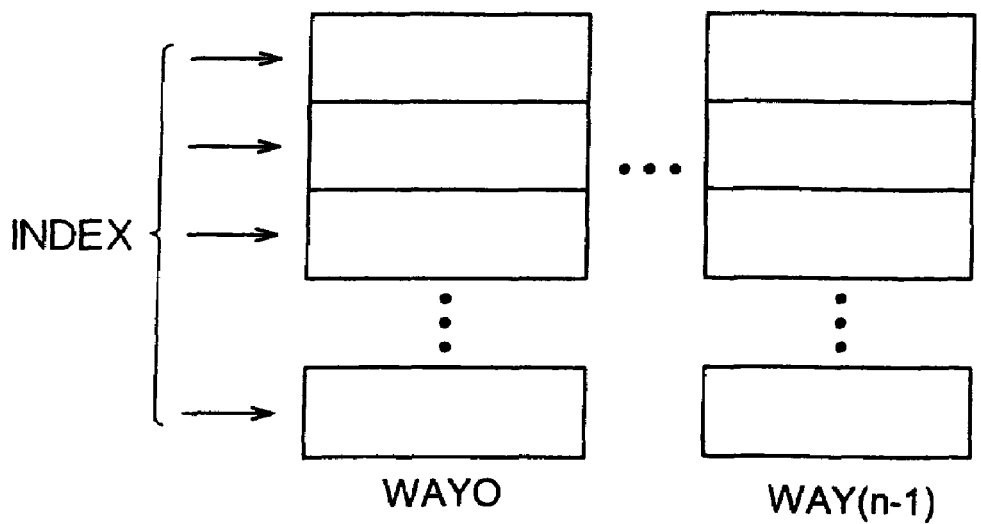
F I G. 3

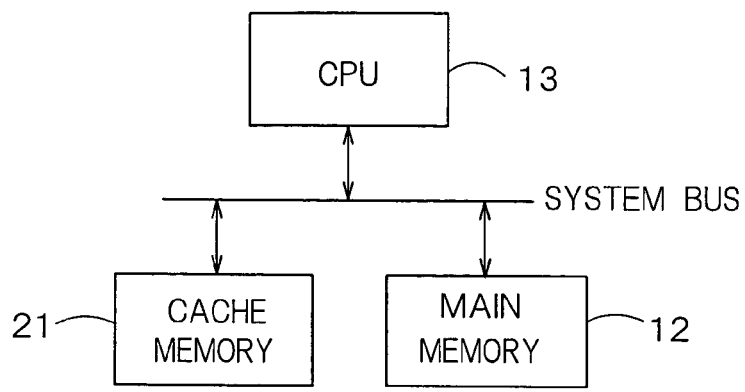
FIG. 4
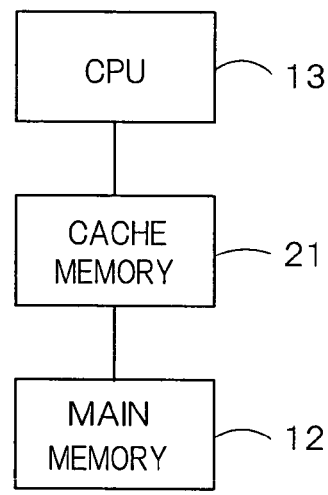
FIG. 5
```
S1;        la    rA,  0×60000001
S2;        sw    rA,  R0
S3;        la    rA,  0×60000000
S4;  Loop : sw   r0,  rA
S5;        addi  rA,  rA,  4
S6;        addi  Rc,  Rc,  -1
S7;        bne   Rc,  $0,  Loop
```
FIG. 6

CACHE MEMORY, PROCESSOR AND CACHE CONTROL METHOD

CROSS REFERENCE TO RELATED APPLICATIONS

This application claims benefit of priority under 35USC§119 to Japanese Patent Application No. 2002-315896, filed on Oct. 30, 2002, the entire contents of which are incorporated by reference herein.

BACKGROUND OF THE INVENTION

1. Field of the Invention

The present invention relates to a cache memory, a processor for embedding the cache memory, and a cache control method of the cache memory.

2. Related Background Art

Operational speed of a CPU is going to become fast. Because it is impossible to operate a memory at speed higher than the CPU, a cache memory is generally provided in order to compensate a speed difference between the CPU and the memory.

A portion of data which has been stored or is to be stored in a main memory is stored in the cache memory in principle. Data in the cache memory maintains consistency with data in the main memory. Accordingly, data which has been stored in the cache memory and is not yet stored in the main memory has to be written back to the main memory, prior to update of the cache memory.

An ordinary main memory is composed of a plurality of ways which have a plurality of indexes and are arranged in parallel.

Although the cache memory is a memory faster than the main memory, a possibility in which cache miss occurs becomes very high, depending on a program executing by the CPU. Especially, in the case of continuously accessing different addresses more than the number of ways, cache miss may continuously occur. Therefore, it may take excess time or memory access.

As mentioned above, there is a likelihood that high performance of the cache memory is not effectively used depending on programs.

SUMMARY OF THE INVENTION

A cache memory according to one embodiment of the resent invention, comprising:

a data storage capable of storing data which requires consistency of data with a main memory; and a storage controller which controls to store data which does not require consistency of data with said main memory in an arbitrary data region in said data storage.

BRIEF DESCRIPTION OF THE DRAWINGS

FIG. 1 is a block diagram showing internal configurations according to one embodiment of a cache memory of the present invention.

FIG. 2 is a diagram explaining a direct map cache.

FIG. 3 is a diagram explaining an n-way set associative cache.

FIG. 4 is a diagram explaining a look-aside type.

FIG. 5 is a diagram explaining a a look-through type.

FIG. 6 is a diagram showing one example of a program using a portion of a cache memory according to the present embodiment as a fixed address memory.

DESCRIPTION OF THE PREFERRED EMBODIMENTS

Hereinafter, a cache memory, a processor and a cache control method according to the present invention will be more specifically described with reference to drawings.

FIG. 1 is a block diagram showing internal configurations of a cache memory 21 according to one embodiment of the present invention. The cache memory 21 of FIG. 1 is an n-way set associative cache shown in FIG. 3. The n-way set associative cache has a plurality of direct map caches arranged in parallel in which replacement candidates in cache lines are decided by middle bit strings of addresses, i.e. indexes. The replacement candidates are provided for n pieces of ways.

Each cell shown in FIGS. 2 and 3 corresponds to a cache line. When a certain address is designated, the cache lines of n pieces of ways corresponding to the middle bit string (index) of the address become candidates for access. The cache memory 21 is accessed in unit of a line.

Data capacity of the cache memory 21 according to the present embodiment is expressed by size of the cache line * the number of indexes * the number of ways.

The cache memory 21 of FIG. 1 has a data memory 1 for storing data, a tag memory 2 for storing address information of data, and a cache controller 3 for determining whether or not to hit to the cache memory 21.

The tag memory 2 has a plurality of PFN (Page Frame Number) unit 4 each being provided for each way, which stores the respective PFNs, and a refill information storage for storing refill information of the cache memory 21. The refill information storage 5 is provided for, for example, each index.

Here, the refill information is information indicative of occurrence orders of refill in the ways. For example, when two ways exist, if the way refilled immediately before is "0", it is assumed that "0" is stored in the refill information storage 5. If the way refilled immediately before is "1", it is assumed that "1" is stored in the refill information storage 5. This is only one example.

At this state, it is assumed that cache access by one index misses, the refill has been occurred, and the refill information storage 5 corresponding to the index is "0". In this case, at next refill time, the way 1 is replaced, and "1" is stored in the refill information storage 5.

When the refill of the same index occurs afterward, because "1" is stored in the refill information storage 5, the way 0 in which time passed after the refill is long is replaced.

The refill information storage 5 may be provided for each index, or provided for each PFN unit 4.

A plurality of PFN units 4 have a plurality of regions designated by indexes, and upper addresses of the addresses (PFN) are stored in the regions.

The tag memory 2 has various flags such as a valid bit showing that the cache line is valid. Because these flags are not related to operations of the present embodiment, explanation will be omitted.

Although internal configuration of the data memory 1 is omitted in FIG. 1, the data memory 1 is composed of a plurality of ways which are arranged in parallel and include a plurality of indexes, similarly to the tag memory 2.

The cache memory controller 3 has a hit detector & encoder 6, a fixed address memory designating unit 7 and a refill object generator 8.

The hit detector & encoder 6 determines that the PFN of the designated address coincides with the PFNs in the PFN units corresponding to the index of the same address in order to specify the coincided PFN unit 4. The fixed address memory designating unit 7 specifies an address used as the fixed address memory (hereinafter, called as a fixed address) when a portion of the cache memory 21 is used as the fixed address memory which does not require consistency of data with the main memory, and determines whether or not the address designated from outside coincides with the fixed address.

More specifically, the fixed address memory designating unit 7 has a fixed address storage 9 for storing the fixed addresses, a fixed address flag storage 10 for storing flag information indicative of whether or not to store the fixed address, and a multiplexer 11 for selecting either the PFN stored in the PFN unit 4 or the fixed address.

The fixed address storage 9 and the fixed address flag storage 10 store a value designated by a store instruction described in a program as described later. Accordingly, programmers can arbitrarily specify values stored in the fixed address storage 9 and the fixed address flag storage 10.

The fixed address memory is allocated at address range different from the address range allocated on reality for a main memory and I/O devices. The programmers can designate arbitrary addresses in the allocated address range.

The refill object generator 8 selects a way to be cached based on a function f (R, C) using the refill information stored in the refill information storage 5 and the flag information stored in the fixed address flag storage 10 as parameters. Concrete forms of the function f(R, C) are not limited. For example, the way in which time passed after lastly performing the refill is the longest may be selected.

There are a look-aside type and a look-through type as connection methods of the cache memory 21. The look-aside type is the method in which the cache memory 21 and main memory 12 are directly connected to the system bus, as shown in FIG. 4. On the other hand, the look-through type is the method in which dedicated buses are provided between the CPU 13 and the cache memory 21, and between the cache memory 21 and the main memory 21, as shown in FIG. 5.

There are a write-through writing method and a write-back writing method as writing methods of the cache memory 21. The write-through writing method is a method which writes data to the cache memory 21 and the main memory 12 at the same time. On the other hand, the write-back writing method is a method which writes data to the cache memory 21 prior to the main memory 12, and writes back to the main memory 12 when the written cache line is rewritten.

The cache memory 21 combining the look-aside type connection method and the write-through writing method is used in the present embodiment. Therefore, it is possible to maintain consistency of data between the main memory 12 and the cache memory 21. Even if a portion of the ways in the cache memory 21 is used as the fixed address memory, there is no likelihood in which consistency of data is lost.

FIG. 6 is a diagram showing one example of the program using a portion of the cache memory 21 of the present embodiment as the fixed address memory. FIG. 6 shows an example in which a line size is 64 byte, the number of ways is four, and the number of indexes is 1024. The specified memory address R0 is used for setting data in the fixed address storage 9 and the fixed address flag storage 10 of the corresponding way. For example, when "0x20000001" is set to the memory address R0, upper 16 bits "2000" is stored in the fixed address storage 9, and a least significant bit "1" is set to the fixed address flag storage 10.

First of all, in step S1, "0x60000001" is loaded in a register rA. Next, in step S2, contents of the register rA are stored in the memory address R0. By storing data in the memory address R0, the corresponding values are stored in the fixed address storage 9 and the fixed address flag storage 10 of the way 0 in FIG. 1, respectively. Accordingly, at time point of executing step S2, the PFN "6000" of the "0x60000001" is stored in the fixed address storage 9, and the least significant bit "1" is stored in the fixed address flag storage 10.

By executing the processings of steps S1 and S2, it is designated that memory area after "0x60000000" is used as the fixed address memory.

In the case of using the cache memory 21 as the fixed address memory, first of all, initialization of the corresponding addresss is performed. First of all, "0x60000000" is loaded to the register rA. Next, in step S4, an initial value designated by the register r0 is stored in an address designated by the register rA.

Next, in step S5, the value of the register rA is incremented for four bytes. Next, in step S6, the value of the register Rc for counting the number of repetitions is decremented by "1". Next, in step S7, until when the value designated by the register Rc becomes zero, the processings of steps S4–S7 are repeated.

With the processings of steps S3–S7, it is possible to initialize memory area used as the fixed address memory.

As described above, according to the present embodiment, it is possible to use the cache memory 21 as the fixed address memory in unit of one way, depending on an arbitrary designation of the programmers. Because of this, it is possible to use a portion of the cache memory 21 as a high speed memory which does not require consistency of data with the main memory.

Furthermore, according to the present embodiment, the cache memory 21 combining the look-aside type connection method and the write-through writing method is used. Because of this, even if a portion of the cache memory 21 is used as the fixed address memory, there is no likelihood that consistency of data with the main memory is lost.

The above-mentioned cache memory 21 may be embedded in the processor, or provided separate from the processor. Or an only portion of the cache memory 21 (for example, the tag memory 2 and the cache controller 3) may be embedded in the processor.

The instruction string showing in FIG. 6 is only one example. The present invention is applicable to various processors such as an RISC type and a CISC type.

Furthermore, the cache controller 3 of FIG. 1 may be realized by software.

What is claimed is:

1. A cache memory, comprising: a data storage device configured to store data which requires consistency of data with a main memory; and a storage controller which controls to store storing data which does not require consistency of data with said main memory, in an arbitrary data region in said data storage device, the arbitrary data region having an address space different from that of said main memory.

2. The cache memory according to claim 1, wherein said arbitrary data region is a data region designated by a programmer.

3. The cache memory according to claim 1, further comprising: a region designating unit which specifies addresses of said arbitrary data region configured to store data which does not require consistency of data with said main memory; and an address coincidence determination unit which determines whether a particular address coincides with the addresses designated by said region designating unit.

4. The cache memory according to claim 3, further comprising a tag unit which stores addresses of data stored in said data storage device, wherein said data storage device and said tag unit include a plurality of ways including a plurality of indexes, respectively; and said region designating unit specifies whether data which does not require consistency of data with said main memory is stored in a corresponding data region unit for each way.

5. The cache memory according to claim 4, further comprising: a refill information storage which stores refill history information of refill in said data storage device; and a refill object selector which selects ways to be refilled based on the refill history information stored in said refill information storage and addresses designated by said region designating unit.

6. The cache memory according to claim 5, wherein said region designating unit includes: an address setting unit provided for each way, which sets addresses of data region for storing data which does not require consistency of data with said main memory; and a setting information storage provided for each way, which stores flag information indicative of whether a prescribed address is set to said address setting unit, wherein said refill object selector selects the way to be refilled based on the refill history information and the flag information.

7. The cache memory according to claim 1, wherein a look-aside type connection configuration in which said main memory and said cache memory are connected to a common system bus, and a write-through writing configuration in which data is written to said main memory and said cache memory at the same time are adopted.

8. A processor which adopts a look-aside type connection configuration in which a main memory and a cache memory are connected to a common system bus, and a write-through writing configuration in which data is written to said main memory and said cache memory at the same time, wherein said cache memory includes: a data storage device capable of storing data which requires consistency of data with said main memory; and a storage controller which controls storing data which does not require consistency of data with said main memory, in an arbitrary data region in said data storage device, the arbitrary data region having an address space different from that of said main memory.

9. The processor according to claim 8, wherein said arbitrary data region is a data region designated by a programmer.

10. The processor according to claim 8, further comprising: a region designating unit which specifies addresses of said arbitrary data region configured to store data which does not require consistency of data with said main memory; and an address coincidence determination unit which determines whether a particular address coincides with the addresses designated by said region designating unit.

11. The processor according to claim 10, further comprising a tag unit which stores addresses of data stored in said data storage device, wherein said data storage device and said tag unit include a plurality of ways including a plurality of indexes, respectively; and said region designating unit specifies whether data which does not require consistency of data with said main memory is stored in a corresponding data region for each way.

12. The processor according to claim 11, further comprising: a refill information storage which stores history information of refill in said data storage device; and a refill object selector which selects ways to be refilled based on the refill history information stored in said refill information storage and addresses designated by said region designating unit.

13. The processor according to claim 12, wherein region designating unit includes: an address setting unit provided for each way, which sets addresses of data region for storing data which does not require consistency of data with said main memory; and a setting information storage provided for each way, which stores flag information indicative of whether prescribed address is set to said address setting unit, wherein said refill object selector selects the way to be refilled based on the refill history information and the flag information.

14. A cache control method which adopts a look-aside type connection method in which a main memory and a cache memory are connected to a common system bus, and a write-through writing method in which data is written into said main memory and said cache memory at the same time, comprising controlling storage of data which does not require consistency of data with said main memory in an arbitrary data region in a data storage device, the arbitrary data region having an address space different from that of said main memory.

15. The cache control method according to claim 14, wherein said arbitrary data region is a data region designated by a programmer.

16. The cache control method according to claim 14, further comprising: designating, in advance addresses of said data region to store data which does not require consistency of data with said main memory; and determining whether a particular address coincides with the designated address.

17. The cache control method according to claim 16, wherein said data storage device and a tag unit which stores addresses of data stored in said data storage device include a plurality of ways including a plurality of indexes; and it is designated whether data which does not require consistency of data with said main memory is stored in a corresponding data region unit for each way.

18. The cache control method according to claim 17, further comprising: storing refill history information of refill in said data storage device; and selecting the way to be refilled based on the stored history information and the addresses designated by said region designating unit.

19. The cache control method according to claim 18, comprising: setting addresses of a data region to store data which does not require consistency of data with said main memory for each way; storing the flag information indicative of whether addresses are set for each way; and selecting the way to be refilled based on said refill history information and said flag information.

* * * * *